United States Patent [19]
Bottum et al.

[11] 4,044,948
[45] Aug. 30, 1977

[54] SOLAR HEATING SYSTEM COMPONENT

[75] Inventors: Edward W. Bottum; Frank H. Rockwell, both of Brighton, Mich.

[73] Assignee: Refrigeration Research, Inc., Brighton, Mass.

[21] Appl. No.: 623,251

[22] Filed: Oct. 17, 1975

[51] Int. Cl.² .................................................. F24J 3/02
[52] U.S. Cl. .................... 237/1 A; 126/271; 126/400; 165/39; 236/91 F
[58] Field of Search .................. 237/1 A, 66; 165/39; 126/270, 271, 400; 236/91 F

[56] References Cited

U.S. PATENT DOCUMENTS

| 941,235 | 11/1909 | Dietrich | 237/66 |
|---|---|---|---|
| 1,250,260 | 12/1917 | Wilcox | 126/271 |
| 1,425,174 | 8/1922 | Cartter et al. | 126/271 |
| 1,853,480 | 4/1932 | Wheeler et al. | 126/271 |
| 1,873,854 | 8/1932 | Wheeler | 126/271 |
| 1,888,620 | 11/1932 | Clark | 126/271 |
| 2,342,211 | 2/1944 | Newton | 126/271 |
| 2,838,043 | 6/1958 | Bliss, Jr. | 126/271 |
| 3,016,801 | 1/1962 | Michel | 237/1 A |
| 3,107,052 | 10/1963 | Garrison | 126/271 |
| 3,390,672 | 7/1968 | Snelling | 126/271 |
| 3,799,145 | 3/1974 | Butterfield | 126/271 |
| 3,977,601 | 8/1976 | Bearzi | 237/1 A |

Primary Examiner—John J. Camby
Assistant Examiner—Henry C. Yuen
Attorney, Agent, or Firm—Whittemore, Hulbert & Belknap

[57] ABSTRACT

The solar heating system component combines a surge tank for a closed solar heat collecting system along with heat exchange means for transferring heat from the primary fluid in the solar heat collecting system to secondary fluid flowing in a secondary circuit which is used for a purpose such as to supply warm water, space heating or cooling and the like.

5 Claims, 2 Drawing Figures

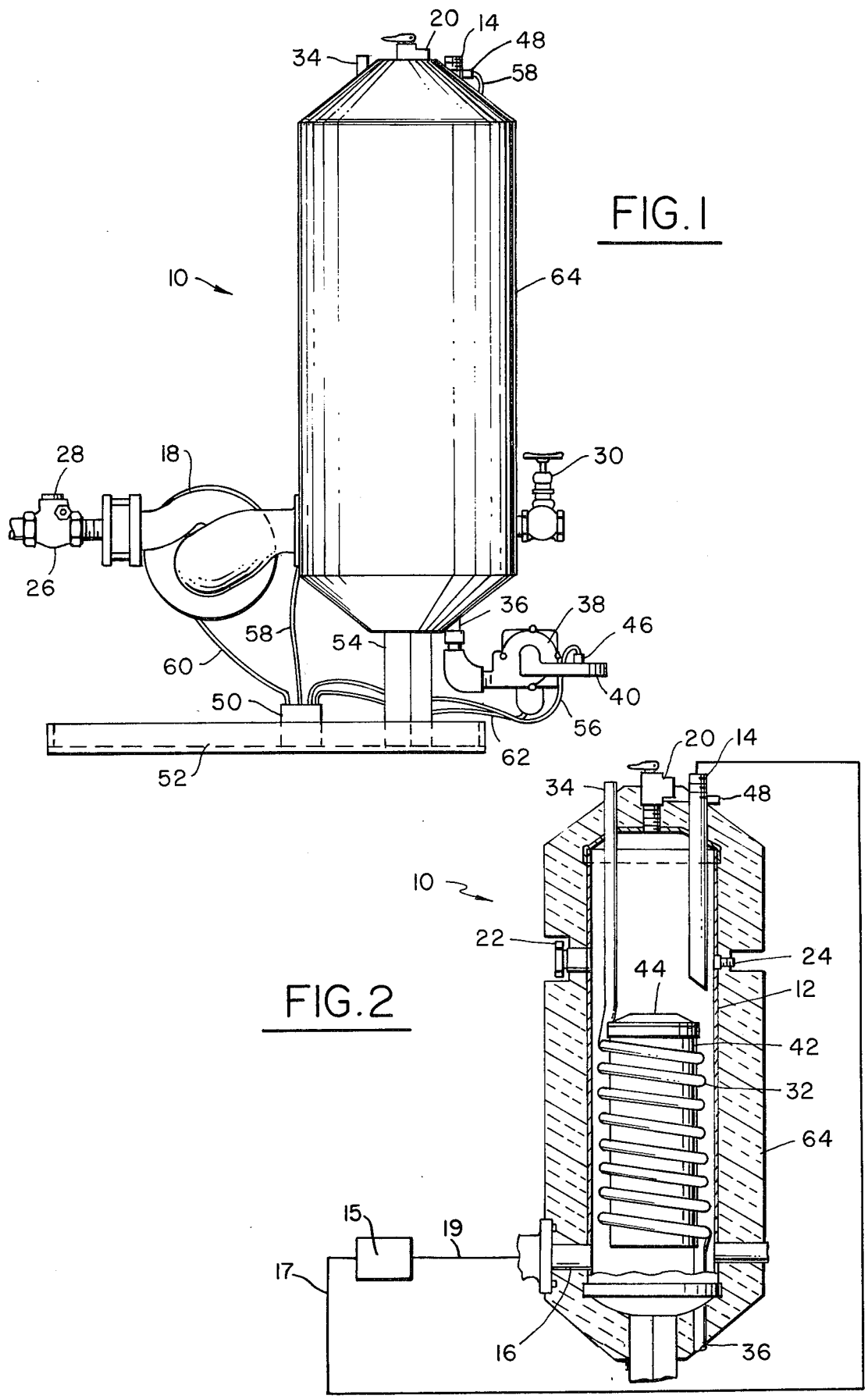

4,044,948

SOLAR HEATING SYSTEM COMPONENT

BACKGROUND OF THE INVENTION

The solar heating system component is adapted for use in connection with a closed solar energy collecting system including a primary system for absorbing heat energy from the sun by means of solar collectors through which flow a primary fluid which is heated and then circulated to a surge tank which also includes heat exchange means. Heat is transferred from the primary fluid to a secondary fluid which flows in a secondary circuit and is used for purposes such as to supply warm water, space heating or cooling and the like.

In theory, the secondary fluid could be heated directly in the solar collectors thereby eliminating the necessity for two circuits. However, in practice, it is usually advisable to provide two circuits, one connected to the solar collectors in which the fluid includes an anti-freeze or corrosion inhibitor while in the other circuit it is usually advisable to circulate substantially pure water. It is therefore necessary to provide heat exchange means between two such circuits in order to transfer heat from the solar collector system to the ultimate use system.

The system which circulates fluid through the solar collector means is a closed system. As a consequence, an expansion tank is required to accommodate expansion and contraction of the fluid in the circuit which is caused by temperature changes. It is also necessary to provide a pressure relief valve in such a system as well as a valve to manually adjust the amount of air in the expansion tank. The system must also have a filling valve and the necessary means to pump fluid therethrough. Such a system constitutes very much the standard hydronic system as commonly used for heating and also adapted for use in solar energy collecting systems.

In addition to all of the above-mentioned components as used in a standard hydronic system, the previously described solar system also requires heat exchange means. A differential thermostat should also be connected with sensors at two points in the system to discontinue heat exchange between fluids in the primary and secondary circuits when the temperature of the fluid in the secondary circuit approaches the temperature of the fluid in the primary circuit.

The assembling and connecting all of the components necessary for the above-described fluid systems as is currently done is time consuming in the field. Also, there is a costly duplication in that separate tanks are used to house a heat exchanger and an expansion tank. Further, there is a duplication of plumbing fittings used in connecting all of the valves and other components.

The present invention provides a combined heat exchanger-expansion tank component to which pumps may be attached with pipe fittings as well as a relief valve and sight glass means to determine air volume. Additionally, a differential thermostat may be mounted on the combined heat exchanger-expansion tank so that motors may be factory wired to the differential thermostat. The tank itself can also be factory insulated.

The present invention results in greatly reduced overall cost and also makes possible much less field installation work than has previously been necessary. Factory pre-engineered and fabricated assembly also insures a more satisfactory operating system. The combination provides a convenient location for checking anti-freeze or corrosion inhibitor and the amount of air or fluid serving the system.

SUMMARY OF THE INVENTION

A solar heating system component is provided. The component comprises a closed vessel having a first fluid inlet and a first fluid outlet. The first fluid inlet is adapted for connection to the fluid outlet of a solar energy collection system through which fluid flows in a closed system as a heat exchange medium. The first fluid outlet is adapted for connection to the fluid inlet of the solar energy collection system. The vessel serves as an expansion tank for the solar energy collection system. A second fluid inlet and a second fluid outlet are provided on the vessel. The second fluid inlet is adapted to receive a fluid to be heated. The second fluid outlet is adapted to forward such heated fluid to a point of use. A heat exchange structure is provided within the vessel and positioned for heat exchange relationship with solar energy collection system fluid in the vessel. The heat exchange structure includes means for fluid flow therethrough. The second fluid inlet and outlet are operably connected to the heat exchange structure.

IN THE DRAWINGS

FIG. 1 is an elevational view of one embodiment of the solar heating system component in accordance with the present invention; and FIG. 2 is a sectional view through the center of the solar heating system component of FIG. 1.

Referring to the figures, the solar heating system component 10 includes a closed vessel 12. The vessel 12 is indicated as being elongated with the longitudinal axis thereof being substantially vertical although this orientation may be changed as desired for a particular application.

There are two inlets and two outlets on the vessel 12. One inlet 14 and one outlet 16 are adapted to be connected to a solar heating system. Such a solar heating system includes one or more solar collectors 15 and other necessary components. Solar collectors are used to convert the sun's rays into heat energy. One type of conventional collector includes a flat plate to which is attached a metallic tubular coil. The flat plate is adapted to collect the sun's rays, convert these rays to heat energy and conduct this heat energy to the tubular coil. A fluid, either a gas or liquid, is circulated through the coils. The fluid is heated in the process. The fluid may contain an antifreeze or corrosion inhibitor. The heat fluid is transported from the collector means into the vessel 12 via line 17 to inlet 14. Fluid from which heat has been extracted is pumped from the vessel 12 via line 19 from outlet 16 by means of a pump 18. The pump 18 causes the fluid to circulate through the system.

The vessel 12 serves as an expansion tank for the fluid circulated in the primary solar heat energy collecting system. It is necessary in such a closed system to have an expansion tank in order to compensate for volume changes in the circulated fluid which occur as a result of temperature changes in the ambient atmosphere. It will be appreciated that solar collectors are of necessity located outdoors and are subject to the constantly changing ambient temperature.

Attached to the vessel 12 are a pressure relief valve 20, a sight glass 22, and an air valve 24, all of which are used in conjunction with the closed solar heat energy collecting system. Two sight glasses may be provided instead of only one. The pressure release valve 20 is necessary in a closed system. As it will be noted, the pressure release valve 20 is located on the top of the vessel 12. There is an air pocket above the fluid in vessel 12 so that if it is necessary to relieve pressure in the system, pressure relief will be gained via release of air rather than the fluid in the system.

If the system is installed in the field by connecting the inlet 14 and pump outlet fitting 26 to the solar collector system by means of suitable pipe, tube or hose. The system is easily charged with its operative fluid by attaching a filling hose to inlet 28 of fitting 26. The fluid will not flow back through the pump 18 but will flow in the direction of the solar collector system and from the solar collector system into the vessel 12 via inlet 14. The desired level in the vessel 12 may be determined by means of the sight glass 22. After the system has been charged, the pump 18 may be operated permitting air trapped in the solar collector system to accumulate in the vessel 12. If the level in the vessel 12 is too low, air valve 24 may be opened to permit some of the compressed air to escape to the ambient atmosphere whereupon the air pressure within vessel 12 will be reduced permitting the fluid level in vessel 12 to rise. The air valve 24 illustrated is a conventional SAE flair fitting containing a "Schraeder" type tire valve stem. If, however, the design of the solar collector systems causes excessive entrapment of air, a vent valve may be necessary on the collectors.

Manually operable valve 30 is provided in the lower portion of vessel 12. The system may be discharged by opening of valve 30. Additionally, valve 30 may be opened to permit an amount of the fluid charge to escape in the event it is desired to reduce the level in vessel 12.

A tubular coil 32 is provided interiorally of vessel 12. An inlet section 36 and outlet section 34 extend from the lower and upper ends of the coil 32, respectively. A pump 38 is provided on inlet 36 for the circulation of fluid, normally pure water, to the intended location of use of heated fluid. The inlet 40 of pump 38 and the outlet 34 are connected to the location where the heated fluid is ultimately used by means of conventional tubing. The ultimate use might be, for example, to supply warm water, for use in space heating or cooling or other like uses.

A tubular member 42 having an upper cap 44 is received within the coil 32. The outer diameter of tubular member 42 is equal to the inner diameter of the coil so that the tubular member 42 fits snugly within the coil. The function of the tubular member 42 is to increase the velocity of fluid passing over the coil and thereby improve heat transfer.

A temperature sensor 46 is provided on the outlet of the pump 38 and a second sensor 48 is provided on the inlet 14 which is substantially at the temperature of the solar collector outlet. A differential thermostat 50 is mounted on base support element 52. The vessel 12 is supported on the base element 52 by means of a short post 54. It will be noted that the vessel 12 is located adjacent one end of the base element 52 so as to balance the weight of the vessel and pump 18 to thereby provide the stable support.

The sensors 46, 48 are connected to the differential thermostat 50 by means of leads 56, 58. Additional leads 60, 62 extend from the differential thermostat to the electric motors which drive the pumps 18, 38. The differential thermostat 50 is caused to de-energize the pump motors when the temperature of the fluid passing into the coil 32 approaches the temperature of the fluid in the vessel 12. As will be appreciated, it is not desirable to circulate the fluids with such a temperature differential because inefficient heat transfer would take place.

The vessel 12 is substantially covered externally with insulating material 64. Openings are provided, however, for actuation of air valve 24 and display of sight glass 22.

Having thus described our invention, we claim:

1. A solar heating system component comprising a closed vessel, a first fluid inlet and a first fluid outlet for said vessel, said first fluid inlet being adapted for connection to the fluid outlet of a solar energy collection system through which fluid flows in a closed system as a heat exchange medium, said first fluid outlet being adapted for connection to the fluid inlet of said solar energy collection system, said vessel defining an expansion tank for said solar energy collection system, a second fluid inlet and a second fluid outlet for said vessel, said second fluid inlet being adapted to receive a fluid to be heated, said second fluid outlet being adapted to forward such heated fluid to a point of use, and a heat exchange structure within the vessel positioned for heat exchange relationship to solar energy collector system fluid in the vessel, said heat exchange structure including means for fluid flow therethrough, said second fluid inlet and outlet being operably connected to said heat exchange structure, a first fluid pump connected to said first fluid outlet and a second fluid pump connected to said second fluid inlet for circulation of fluid through the respective systems, a first temperature sensor located to sense the temperature at the collector outlet, a second temperature sensor located to sense the temperature of fluid pumped by said second pump, a differential thermostat connected to said first and second sensors, means operably connecting said differential thermostat to said pumps to de-energize said pumps when the temperature of fluid being pumped by said second pump approaches the temperature of the fluid being pumped by said first pump, a pressure release valve for said vessel, and an air valve operable to close and open on said vessel located at a position above a selected level of solar energy collection system fluid to be present in said vessel to permit relief of air pressure in said vessel.

2. A solar heating system component as defined in claim 1, further characterized in that said heat exchange structure comprises a tubular coil and a tubular member within said coil, said tubular member having an outer diameter substantially equal to the inner diameter of the coil.

3. A solar heating system component as defined in claim 1, further characterized in that said pressure release valve is located on an upper portion of said vessel.

4. A solar heating system component as defined in claim 1, further characterized in the provision of third fluid inlet means on said first fluid outlet for charging said solar energy collection system with fluid, and means for preventing passage of fluid from said third fluid inlet directly into said vessel.

5. A solar heating system component as defined in claim 1, further characterized in the provision of valve means on said vessel to permit discharge of solar energy collection system fluid from said vessel.

* * * * *